PFLEGHAR & SCHOLLHORN.
Machine for Finishing Nuts.
No. 44,818.
2 Sheets—Sheet 2.
Patented Oct. 25, 1864.
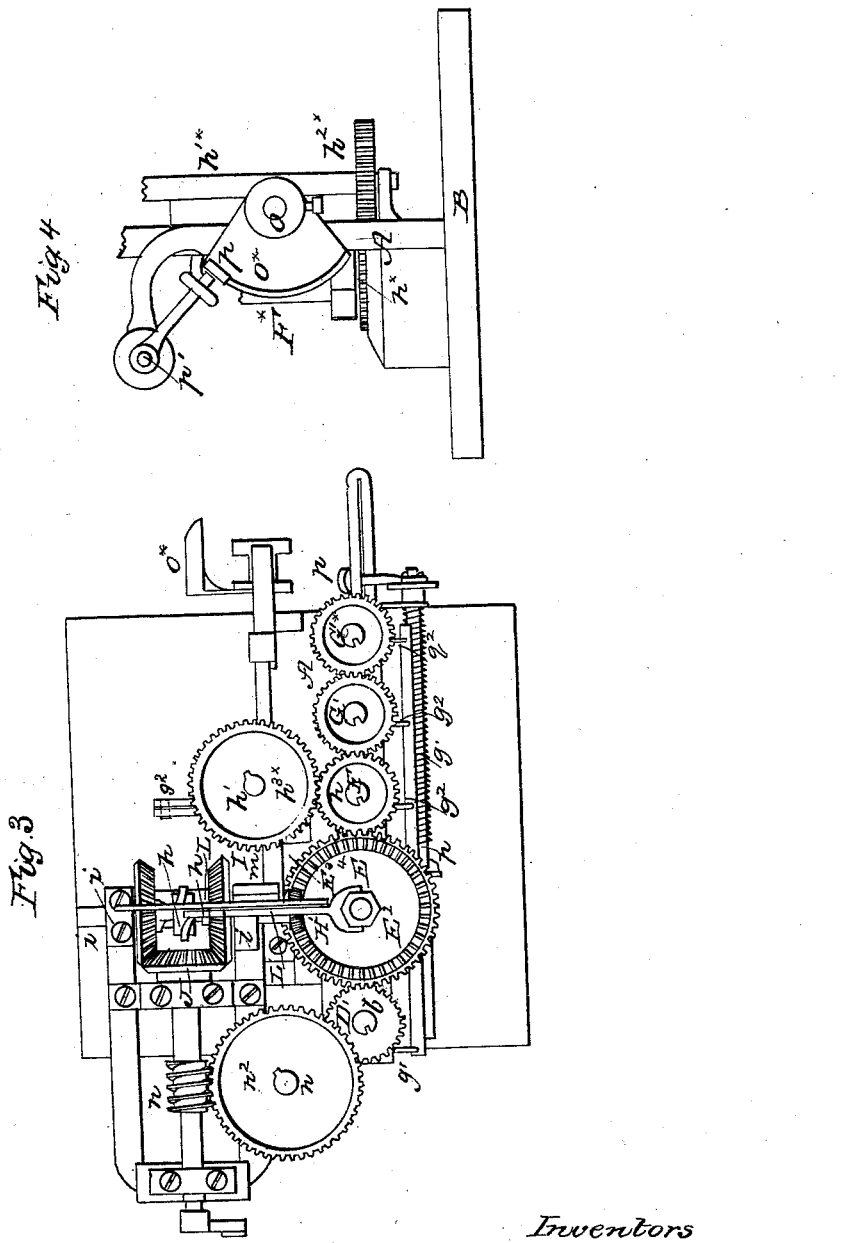

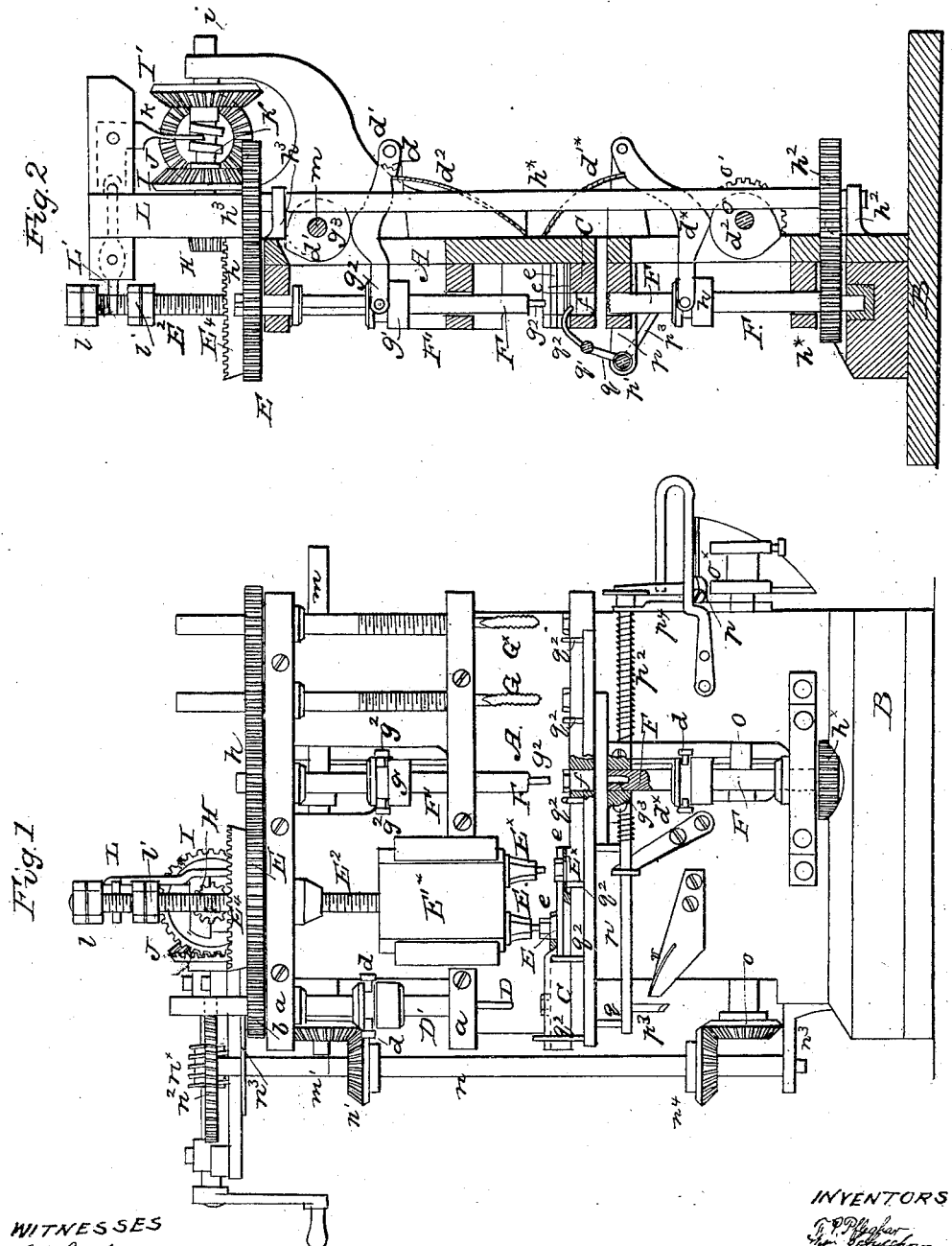

UNITED STATES PATENT OFFICE.

FRANK P. PFLEGHAR AND WILLIAM SCHÖLLHORN, OF NEW HAVEN, CONN.

MACHINE FOR FINISHING NUTS.

Specification forming part of Letters Patent No. 44,818, dated October 25, 1864.

*To all whom it may concern:*

Be it known that we, FRANK P. PFLEGHAR and WILLIAM SCHÖLLHORN, of New Haven, in the county of New Haven and State of Connecticut, have invented a new and Improved Machine for Finishing Nuts; and we do hereby declare that the following is a full, clear, and exact description thereof, which will enable others skilled in the art to make and use the same, reference being had to the accompanying drawings, forming part of this specification, in which—

Figure 1 represents a sectional front elevation of this invention. Fig. 2 is a transverse vertical section of the same. Fig. 3 is a plan or top view of the same. Fig. 4 is a partial end elevation of the same.

Similar letters of reference indicate like parts.

The object of this invention is to finish nuts as the same are received from the blacksmith, the nut-machine, or from the foundry by reaming out the holes to the proper size, forcing the nuts through dies, so that the sides of the same are rendered flat and bright, smoothing off the upper and lower surfaces, and, finally, tapping the nuts, which are shifted from one reamer or punch to the other by the automatic action of the machine in such a manner that the operator or attendant has nothing else to do but feed in the rough and unfinished nuts, which, when finished by the machine, are deposited in a suitable receptacle ready for immediate use.

The various working parts of our machine and its entire mechanism are secured to a frame, A, which consists of a stout, broad, upright standard rising from the bed-plate B. Secured to the front side of the frame A is the channel C, which receives the nuts, and in which the same are exposed successively to the action of the reamer D, then to that of the punches E E*, then to that of the scrapers or milling-tools F F*, and, finally, to that of the taps G G*. The reamer D is secured in a vertical spindle, D', which has its bearings in suitable journal-boxes, $a$, secured at the proper distance apart on the front side of the frame A, and it is rotated by the action of a cog-wheel, $b$, which connects with the said spindle in such a manner that they are compelled to rotate simultaneously in either direction; but the spindle is free to move in a vertical direction independent of the wheel. Said spindle is provided with a grooved collar, $c$, to receive the forked end of a lever, $d$, which has its fulcrum on a pivot, $d'$, inserted in an arm or bracket, which is secured to the rear surface of the frame A. A spring, $d^2$, bearing on the under edge of the lever $d$, keeps the same in contact with the surface of a cam, $d^3$, so that by the action of the cam the spindle D' is gradually depressed and afterward gradually raised by the action of the spring, and if a nut has been previously adjusted under the reamer the hole in said nut is reamed, out and the reamer withdrawn entirely by the action of the machine.

After the hole in the nut has been reamed out to the proper size by the action of the reamer, the nut is pushed along in the channel and placed under the punch E. A cylindrical stud projecting from the under surface of the punch enters the hole of the nut and brings the same in a central position over the die E', and when the punch descends the nut is forced through said die, and its sides are scraped off and rendered smooth and uniform. After passing through the first die the nut is pushed along in the channel C and deposited over the die E'* and under the punch E*, which are formed precisely like the die E' and punch E, but somewhat smaller than the former, so that by forcing the nut through this second die a final finish is given to the sides of the nut.

In order to obtain room for the dies E' E'* it is necessary to make two steps, $e$, in the channel C, and the die E' is arranged in the first, and the die E'* in the second, step, as clearly shown in Fig. 1 of the drawings.

After passing through the second die the nut is moved along over the hole $f$, which is large enough to take the nut, but so shaped that said nut is not allowed to turn in it. This hole is situated between two scrapers or milling-tools, F F*, which are arranged as follows:

The milling-surface of the tool F is formed by teeth cut in the end of a spindle, F', which is rotated by the action of a cog-wheel, $h$, and otherwise constructed precisely like the spindle D' of the reamer D. It is provided with a grooved collar, $g'$, and the forked end of the lever $g^2$ catches into this collar and raises and depresses the tool by the action of a suitable cam and spring on said lever.

The tool $F^*$ is formed by teeth cut in the top surface of the spindle $F'^*$, which is situated below the hole $f$ and in line with the spindle $F'$. Rotary motion is imparted to the spindle $F^*$ by a cog-wheel, $h^*$, and it is raised and depressed by the action of a forked lever, $d^*$, which catches in a grooved collar, $h'$, on the spindle, and which is subjected to the action of a spring, $d'^*$, and cam $d^{2*}$, as clearly shown in Fig. 2 of the drawings.

By the action of the levers $g^2$ and $d$ the tools F $F^*$ close up, and a cylindrical projection, $g^3$, on the tool F passes through the hole in the nut and into a corresponding cavity, $g^{3*}$, in the tool $F^*$, to keep said tools steady during the operation of milling.

By the action of the milling-tools F $F^*$ the upper and lower surfaces of the nut are scraped off, and after this operation is finished the nut is pushed along in the channel C and brought under the first tap, G, which is secured in a spindle, G', similar in every respect to the spindle D' of the reamer, and rotated by suitable gear-wheels in the proper direction. For the purpose of depressing this spindle a lever may be used similar to that used for depressing the spindle D', or it may be provided with a screw thread, which will feed it down, as shown on the spindle $G'^*$ of the second tap $G^*$.

The first tap is tapering and cuts the thread in the nut accordingly; but the second tap is cylindrical and finishes the thread in the nut. This second tap is brought into action after the nut has been tapped with the first tap and shifted along in the channel to the proper position under said second tap. After the second tap $G^*$ has acted on the nut and releases the same said nut is finished, and it is pushed out of the channel C into a suitable receptacle ready for immediate use.

It remains to describe the manner in which the various parts of our machine are geared together, and in which the motion of the several tools is reversed, and the nut shifted from one tool to the next.

The punches E $E^*$ are secured in the under surface of a carriage, $E'^*$, which moves up and down in suitable guideways secured to the front side of the frame A. From this carriage rises a screw-spindle, $E^2$, which is secured to the same, so that it is free to revolve independent thereof, but that when the spindle rises and falls the carriage is compelled to move with it. Said screw-spindle is tapped into the hub of a cog-wheel, $E^3$, and this hub is confined in a suitable journal-box secured to the frame A, so that the wheel $E^3$ is allowed to revolve freely in either direction, without, however, being able to move in the direction of the axis of the screw-spindle.

A bevel-wheel, $E^4$, which is rigidly attached to or cast solid with the cog-wheel $E^3$, gears in a pinion, H, on the clutch-shaft $i$, which has its bearings in journal-boxes $i'$ on an arm extending back from the frame A, as clearly shown in Fig. 2 of the drawings. On this shaft run loosely two bevel-wheels I I', which gear both in a bevel-wheel, J, on the end of the driving-shaft $j$, and the hubs of the bevel-wheels I I' are provided with teeth to engage with corresponding teeth of the clutch K. This clutch slides on the shaft $i$, and it is operated by an elbow-lever, $k$, which throws the same in gear with either of the bevel-wheels I I'. The elbow-lever is pivoted to a bracket, L, extending over the bevel-wheels I I', and its horizontal arm engages with one end of the switch-lever L', the other forked end of which embraces the screw-spindle $E^2$ between two shoulders or projections, $l$ $l'$. These shoulders are formed by nuts, or in any other suitable manner, and they are placed far enough apart so that the screw-spindle rises and falls the requisite distance before the motion is changed. By diminishing the space between the shoulders $l$ $l'$ the stroke of the carriage is shortened, and vice versa, and the motion of the whole machine is reversed by the action of the clutch-lever. We do not wish to confine ourselves, however, to the precise mechanism hereinbefore described, for the purpose of reversing the motion, and we reserve the right to move the clutch by any other suitable mechanism, such as a cam and lever, or to use in place of the clutch and bevel-wheels I I', other means, such as two fast and two loose pulleys, similar to those generally used for the purpose of reversing the motion of a planing-machine at given intervals.

The cog-wheel $E^3$ gears in the cog-wheels $b$ and $h$, which impart motion to the reamer D and milling-tool F, and through the wheel $h$ the motion is transmitted to the milling-tool $F^*$ and to the taps G $G^*$.

The wheel $h$ on the top end of the spindle of the milling-tool F, gears in a cog-wheel, $h^{3*}$, mounted on the upper end of a vertical shaft $h'^*$, which has its bearings in arms $h^2$, projecting from the rear surface of the frame A, and which bears near its lower end a cog-wheel, $h^{2*}$, (to gear in another cog-wheel, $h^*$,) on the lower end of the spindle of the milling-tool $F^*$, as clearly shown in Fig. 2 of the drawings. By this arrangement the rotary motion of the two milling-tools is rendered uniform in either direction.

The cams $d^3$ and $g^3$ are mounted on a horizontal shaft, $m$, which has its bearings in suitable journal boxes on the rear side of the frame A, and to which motion is imparted by bevel-gear $m'$ $n'$, as clearly shown in Fig. 1 of the drawings. The bevel-wheel $n$ is secured to a vertical shaft, $n$, to which a slow rotary motion is imparted by the action of an endless screw, $n^*$, on the driving-shaft, gearing in a worm-wheel, $n^2$, which is mounted on the top end of the shaft $n$. This shaft has its bearings in arms $n^3$, which extend from the end of the frame A, and a bevel-wheel, $n^4$, mounted on its lower part, gears in a similar bevel-wheel, $o'$, on the horizontal shaft $o$, which bears the cam $d^{2*}$, through the action of which the lower milling-tool, $F^*$, is raised, as previously described.

A second cam, $o^*$, which is mounted on the extreme end of the shaft $o$, acts upon a friction-roller, $p$, on the end of an arm which extends from the sliding rod $p'$, and by the action of the cam said rod is moved against the spring $p^2$ in the direction of the arrow marked thereon in Fig. 1. Said spring is wound round the rod $p'$ and connected to it in such a manner that it forces the same back to its orignal position as soon as it is released from the cam $o^*$. The rod $p'$ has its bearings in arms $p^4$, extending from the frame A, and is connected by studs $q$ to the rod $q'$, which carries the fingers $q^2$. These fingers extend into the channel C, and serve to push the nuts to be finished from one tool to the other.

In order to prevent the fingers from passing over the nuts in pushing the same forward in the channel, an arm, $p^3$, extends from the sliding rod $p'$, and as this rod moves forward in the direction of the arrow marked thereon in Fig. 1 said arm passes under an inclined plane, $r$, which is secured to the frame A. Said inclined plane is made of thin sheet metal and elastic, so that when the arm $p^3$ passes forward the point of the inclined plane is forced up, and as said arm passes beyond the point of the inclined plane the point springs back to its original position, and the arm in going back strikes the inclined plane above its point, and is compelled to pass up over its upper surface in order to clear it. During this motion the arm, being raised, turns the rod in the direction of the arrow marked thereon in Fig. 2, and the fingers $q^2$ are thown back, so that they clear the nuts in the channel and catch behind the same, ready for a new move. It must be remarked, however, that this oscillating motion of the fingers is not absolutely necessary for the success of the operation, for the finger-bar might be so situated in relation to the channel C that a simple reciprocating motion imparted to it would be sufficient to enable the fingers to clear the nuts in going back.

We do not wish to confine ourselves, therefore, to the precise mechanism shown in the drawings, but reserve the right to make such changes therein as may be requisite to produce the same or a similar result.

By a machine of this construction square, hexagonal, or octagonal nuts can be finished up on the sides and ends, or upper and lower surfaces, without requiring any other attention except to feed in the nuts at the proper intervals, and, if desired, the labor of feeding in the nuts might also be accomplished by suitable mechanism.

Having thus described our invention, we claim as new and desire to secure by Letters Patent—

1. The successive use of a reamer, D, punch or punches E E*, milling-tools F F*, and taps G G*, in a machine for finishing nuts constructed and operating in the manner and for the purpose substantially as herein shown and described.

2. The use of milling-tools F F*, arranged substantially as herein specified, for the purpose of cleaning off the faces of a nut.

3. The steps $e$ in the channel C, arranged substantially as and for the purpose set forth.

4. The reversing-gear I I' J, clutch K, and switch-lever L', or their equivalents, arranged in combination with the wheels $b$ $E^3$ $h$, which impart motion to the various tools in the manner and for the purpose substantially as herein specified.

5. The adjustable shoulders $l\,l$, applied in combination with the switch-lever L', and with the reversing-gear, substantially as and for the purpose herein described.

6. The automatically-reciprocating rod $p'$ and fingers-bar $q'$, applied in combination with the channel C and tools, D E E* F F* G G* in the manner and for the purpose substantially as described.

7. The arm $p^3$ and inclined plane $r$, in combination with the reciprocating rod $p'$, finger-bar $q'$, and channel C, constructed and operating substantially as and for the purpose set forth.

FRANK P. PFLEGHAR.
WM. SCHÖLLHORN.

Witnesses:
ALEB MIX,
JOHN HOLLISTER.